July 9, 1935.  C. C. FARMER  2,007,677
CHECK VALVE DEVICE
Filed Nov. 9, 1934
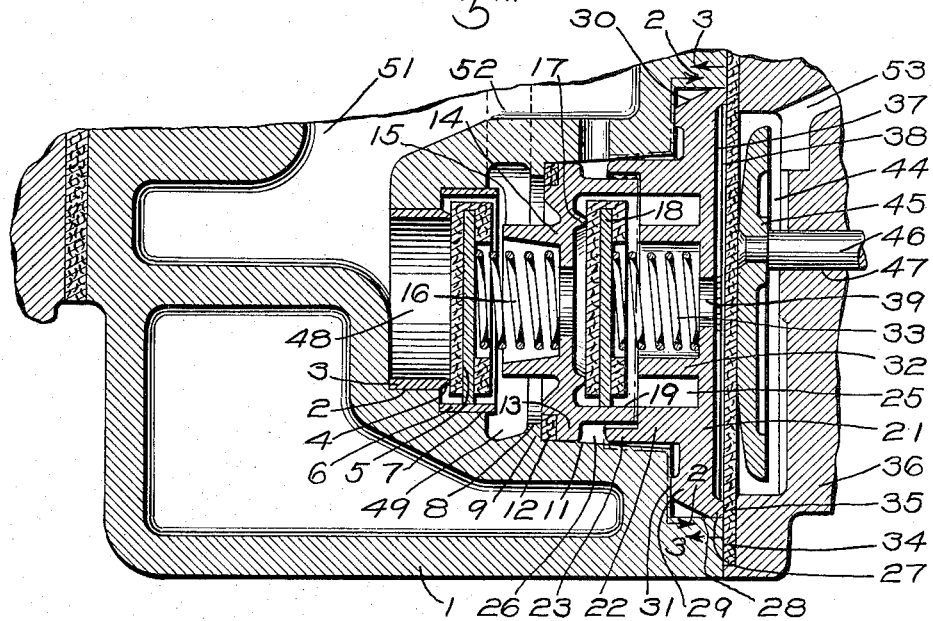
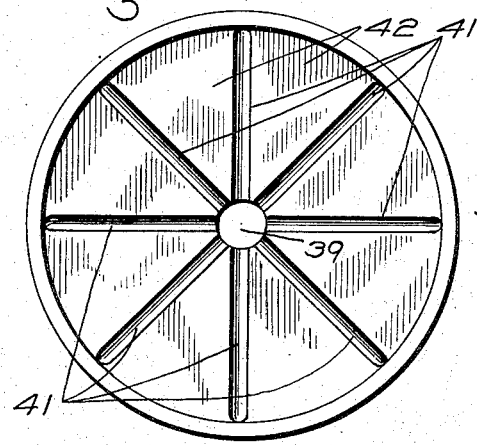
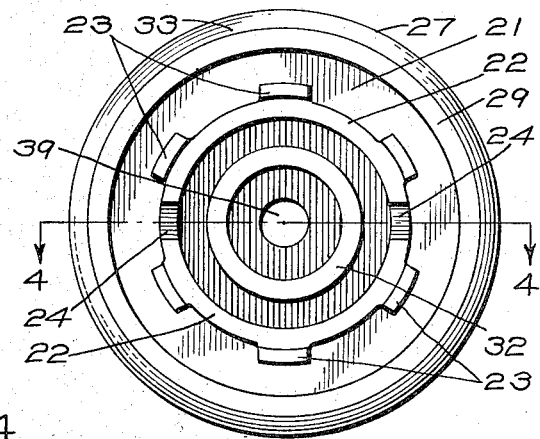
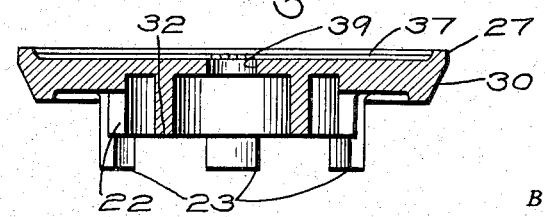
*INVENTOR*
CLYDE C. FARMER
BY
*ATTORNEY*

UNITED STATES PATENT OFFICE 2,007,677

CHECK VALVE DEVICE

Clyde C. Farmer, Pittsburgh, Pa., assignor to The Westinghouse Air Brake Company, Wilmerding, Pa., a corporation of Pennsylvania Application November 9, 1934, Serial No. 752,225

12 Claims. (Cl. 277—61)

This invention relates to fluid pressure brake equipment and particularly to check valve devices such as are employed in fluid pressure brake controlling valve devices.

An object of the invention is a provision of the multiple check valve device that may be assembled within a single chamber and wherein the several parts of the structure may be successively inserted within the chamber without interference with other parts of the control valve device, and wherein the several parts may be successively removed through a single opening in the valve casing for the purpose of inspection and repair.

Another object of the invention is the provision of the combined check valve and movable abutment device wherein parts of the check valve mechanism are utilized to support the movable abutment and wherein the check valve devices are retained in assembled position by the movable abutment and the cover for said abutment.

A further object of the invention is to provide a combined check valve and movable abutment device having the above noted characteristics wherein a check valve seat member and the retainer member therefor are provided with centering facilities for assisting in maintaining the parts in their proper relative positions during assembly thereof, and wherein the diaphragm of the movable abutment device is so supported by the valve seat retaining member that a relatively large effective area of the diaphragm is subjected to fluid pressure within the valve chamber when the diaphragm is resting upon said retaining member.

A further object of the invention is the provision of a combined multiple check valve and movable abutment device wherein certain of the parts thereof serve multiple duties, thereby reducing the number of parts required to a minimum, and wherein the parts are simple and relatively inexpensive and may readily be assembled and retained in operative position by a single cover member.

Other objects and advantages of my invention will be apparent from the following description of one preferred embodiment thereof when read with reference to the accompanying drawing in which, Fig. 1 is a longitudinal sectional view through a combined multiple check valve device and movable abutment device embodying the invention, Fig. 2 is a plan view of the retainer, or stop member, shown in Fig. 1 viewed in the direction of the arrows 2—2, Fig. 3 is a plan view of the retainer, or stop member, viewed in the direction of the arrow 3—3 in Fig. 1, and Fig. 4 is a longitudinal sectional view through the retainer or stop member taken along the line 4—4 of Figure 2.

This application is a continuation in part of my copending application for Check valve device, Serial No. 613,445, filed May 25, 1932, and assigned to the same assignee as this application. The valve structure illustrated is of the same type and character as that disclosed in my copending application for Fluid pressure brakes, Serial No. 612,465, filed May 20, 1932, and assigned to the same assignee as this application, and, since the functions of the valve structure herein disclosed are fully set forth in that application and, since the invention to which this application is directed relates to certain improvements over the invention disclosed in that application, the general functions to be performed will be but briefly referred to herein.

Referring to the drawing, the valve structure comprises a casing 1 having a chamber formed by a series of bores of gradually increasing diameter, which chamber constitutes a part of a fluid passage or passages and which may be divided into a series of chambers as will hereinafter appear.

Beginning at the left of the series of bores the bore 2 constitutes the inner portion of the chamber and supports a cylindrical tube 3 that is inserted therein to provide a valve seat 4 upon which a disc valve 5 is seated. A cylindrical bushing 6 is inserted in the adjacent bore 7 which is larger in diameter than the bore 2, the bushing serving as a guide for the valve 5. The next adjacent bore 8 is made slightly larger in diameter than the bore 7 in order to permit the bushing 6 to freely pass through it during assembly, and constitutes the inner surface of a flange 9, the outer side of which provides a shoulder between the bores 8 and 11 for receiving a gasket 12 against which a flange 13 of a valve seat member 14 closely fits within the bore 11. The bore 11 is frusto-conical in shape so that it provides an inclined surface which serves to guide the valve seat member 14 and center it in its proper position within the bore in engagement with the gasket 12.

The valve seat member 14 is provided on its inner side with a cylindrical flange 15 that extends toward the valve 5 and which serves to limit the outward movement of the valve 5 away from the valve seat 4 and to center a spring 16 interposed between and engaging the valve 5 and the valve seat member 14 for urging the valve into engagement with the valve seat 4.

The outer side of the valve seat 14 is provided with a seat rib or valve seat 17 upon which a valve disc 18 is seated, the valve being guided in a cylindrical flange 19 projecting from the outer face of the valve seat member 14.

The valve seat member 14 is held in its operative position, as shown, by a retainer or stop member 21 having on its inner face a pair of semi-circular flanges 22 that are aligned with and engage the cylindrical flange 19 of the valve seat member 14, so as to prevent outward movement thereof. The flanges 22 are provided with forwardly extending fingers or lugs 23 which are designed to closely fit the body or flange 19 of the valve member 14 to retain the valve stop member 21 in position during assembly of the device. The flanges 22 are separated to provide spaces 24 through which fluid may flow from the inner chamber 25 formed within the flanges 19 and 22 to the outer annular chamber 26.

The outer rim 27 of the retainer or stop member 21 engages within a bore 28 and an inwardly extending annular flange 29 thereon engages the shoulder 31 formed between the bores 11 and 28. The inner face of the retainer is also provided with a cylindrical projection 32 which serves to center a spring 33 that is interposed between, and engages the valve 18 and the retainer or stop member 21, and which serves to urge the valve 18 into engagement with the valve seat 17. The projection 32 also serves to limit movement of the valve 18 from its seat. The retainer or stop member 21 is provided with a conical or sloping surface 30 inwardly of its outer periphery 27 that is adapted to engage the casing wall at the mouth of the bore 28 and guide the retainer into the assembled position shown, thereby facilitating the assembly of the valve device.

The outer face of the periphery 27 of the retaining member 21 is flush with the face 34 of the casing 1 and is engaged by a flexible diaphragm 35 that also serves as a sealing gasket between the casing and a cover member 36, and which is clamped between the casing and cover member when the latter is secured to the casing by means of bolts or screws, not shown.

The outer face of the retainer member 21 is provided with a recess 37, which provides a chamber 38 between the retainer and the diaphragm 35, that receives fluid under pressure from the valve chamber 25 through a central opening 39. The inner face of the diaphragm 35 is therefore subject to fluid pressure upon substantially all of its exposed areas. The outer face of the retainer is provided with radial grooves 41 extending from the opening 39 toward the outer periphery of the member, which serve to supply fluid under pressure to the space between the diaphragm and the flat surfaces 42 between the grooves 41 in the face of the retainer member 21. By reason of this construction substantially the entire inner face of the diaphragm 35 is subjected to fluid pressure within the chamber 38.

The outer face of the diaphragm 35 is subject to fluid pressure within a chamber 44 between the diaphragm and the cover 36. A follower 45 is secured to the outer face of the diaphragm and serves to operate a valve mechanism, not shown, through the medium of a stem 46 that extends through a bore 47 in the cover 36.

By reason of the valve mechanism inserted in the face formed by the series of bores within the casing structure this face is divided into a chamber 48 on the inner side of the valve 5, a chamber 49 between the valve 5 and the valve 18, and a chamber 25 on the outer side of the valve 18. The valve 5 controls communication between the chamber 48 and the chamber 49, and the valve 18 controls communication between the chamber 49 and the chamber 25. A chamber 38 is also provided on the inner side of the diaphragm 35, that is in communication with the chamber 25, through the opening 39, and an annular chamber 26 is provided about the flanges 19 and 22 that is in communication with the chamber 25 through the openings 24 between the flanges 22. The diaphragm chamber 44 is also provided between the outer side of the diaphragm 35 and the cover 36.

From the foregoing description it is apparent that the parts of the valve device disclosed may be successively placed in their respective operative positions beginning with the insertion of the valve seat bushing 3 and ending with the securing of the closure or cover member 36 upon the casing 1 by bolts, not shown, and that the assembly is facilitated by the inclined conical bore 11 provided for guiding the valve seat member to its operative position, and by the conical surface 30, provided for guiding the retainer member to its operative position. It will be further noted that the interfitting of the valve seat member within the fingers or lugs on the inner side of the retainer member aids in holding the retainer member in its assembled position until the cover member is attached, and that all of the parts are retained in their operative positions shown by the cover member when completely assembled. It will also be noted that the parts are readily accesssible for successive removal and repair when the cover is removed. It will also be noted that, when the auxiliary reservoir pressure within the chamber 44 is considerably above the brake pipe pressure within the chamber 38, thus forcing the diaphragm 35 toward the left, the flange 29 on the inner face of the retainer member 21 will engage the shoulder 31 thus preventing excessive strain on the gasket 12.

By clamping the valve seat member and the retainer between the yielding gasket 12 and the yielding diaphragm 35, the parts are securely retained in place regardless of any slight discrepancies in overall dimensions incident to manufacture.

In the use of the valve device structure, disclosed in my above mentioned copending application, the chambers 48 and 26 are connected by a passage 51 leading to the triple valve piston chamber, not shown, and the chamber 49 is provided with a passage 52 leading from the strainer member, not shown, of the triple valve device that is connected to the brake pipe, not shown. The chamber 44 is connected to an auxiliary reservoir, not shown, by a passage 53.

The valve structure disclosed is particularly adapted for use in the brake controlling valve device referred to above and disclosed in my copending application, and the check valves are so arranged that when the pressure in the chamber 49 is increased a predetermined amount above that in the chamber 25, the valve 18 is forced from its seat 17 by the higher pressure on the left face thereof and fluid may then flow past the valve 18 from chamber 49 to chamber 25 and thence through passages 24 and the annular chamber 26 to the passage 51.

When the pressure in the chamber 49 is reduced a predetermined amount below that in the passage 51 and the chamber 48, the higher pressure on the left face of the valve 5 forces the valve from its seat 4 and permits fluid to flow from the chamber 48 past the valve 5 to the chamber 49, and to the passage 52.

When the pressure is increased in the chambers 25 and 38 above the pressure in the chamber 44, the diaphragm 35 is flexed outwardly or toward the right causing movement of the follower 45 and the stem 46 for actuating a release insuring valve or other valve mechanism, not shown.

While I have disclosed the valve structure as particularly useful for controlling a by-pass around a brake pipe fluid strainer in a triple valve device, it is obvious that the construction of the valve and movable abutment may be modified for use in other fluid pressure apparatus and that the chambers controlled by the valve may be connected to various reservoirs and devices for obtaining other effects without departing from the spirit of the invention.

Having now described my invention, what I claim as new and desire to secure by Letters Patent, is:

1. The combination with a casing having a chamber through which fluid under pressure is adapted to flow, the outer portion of said chamber having a cylindrical bore and the next adjacent portion having a bore of less diameter than the outer portion to form a shoulder between the two bores, of a member mounted in said chamber and having a valve seat on its outer face and a cylindrical guide wall portion of less diameter than the chamber, a valve positioned within said guide portion and guided thereby to move into engagement with said valve seat, a retaining member inserted in said chamber and having an outer annular rim fitting into the outer cylindrical bore of the chamber and having an inwardly extending annular flange engaging said shoulder and an inwardly extending cylindrical portion registering with and engaging the outer end of said cylindrical portion of said valve seat member, a spring interposed between and engaging said valve and said retaining member for biasing said valve toward its seat, and means on said retaining member for centering said spring and for limiting movement of said valve away from said seat.

2. The combination with a casing having a chamber through which fluid under pressure is adapted to flow, the outer portion of said chamber having a cylindrical bore and the next adjacent portion thereof having an inwardly tapered bore of less outer diameter than the cylindrical bore to form a shoulder between the two bores, of a member mounted in said chamber and having a valve seat on its outer face and a cylindrical guide portion of less diameter than the chamber, a valve positioned within the guide portion and movable into engagement with said valve seat, a retaining member inserted in the chamber having an outer periphery fitting into the cylindrical bore and an inwardly extended annular flange in engagement with said shoulder and having a cylindrical portion guide by said tapered bore for registering with and engaging the outer end of a cylindrical portion of said valve seat member, a spring interposed between and engaging said valve and said retaining member for biasing said valve toward its seat, and means on said retaining member for centering said spring and for limiting movement of said valve away from said seat.

3. The combination with a casing having a chamber through which fluid under pressure is adapted to flow, of a member mounted in said casing and having a valve seat on its outer face and a cylindrical guide wall portion of less diameter than the chamber, a valve positioned within the guide wall portion and movable into engagement with said valve seat, a retaining member inserted in the chamber and having a cylindrical portion registering with and engaging the outer end of the cylindrical portion of said valve seat member and having inwardly extending fingers for closely fitting about the cylindrical portion of said valve seat member to retain the two members in position, a spring interposed between and engaging said valve and said retaining member for biasing said valve toward its seat, and means on said retaining member for centering said spring and for limiting the movement of said valve from its seat.

4. The combination with a casing having a chamber through which fluid under pressure is adapted to flow, of a member mounted in said chamber and having a valve seat on its outer face and a cylindrical guide portion of less diameter than the chamber, a valve positioned within the cylindrical guide portion that is movable into engagement with said valve seat, a retaining member inserted in the chamber and having a cylindrical portion registering with and engaging the outer end of the cylindrical portion of said valve seat member and having inwardly extended fingers adapted to be guided by the inwardly tapered bore of the casing and to fit closely about the cylindrical portion of the valve seat member to retain the two members in position, a spring interposed between and engaging said valve and said retaining member for biasing said valve toward its seat, and means on said retaining member for centering said spring and for limiting the movement of said valve from its seat.

5. The combination with a casing having a chamber through which fluid under pressure is adapted to flow, of a member mounted in said chamber and having a valve seat on its outer face and a cylindrical guide wall portion of less diameter than the chamber, a valve positioned within the guide wall portion and movable into engagement with said valve seat, a retaining member inserted in the chamber and having a cylindrical portion registering with and engaging the outer end of the cylindrical portion of said valve seat member, and having means engaging said casing for centering said retaining member within said chamber, a spring interposed between and engaging said valve and said retaining member for biasing said valve member toward its seat, and means on said retaining member for centering said spring and for limiting the movement of said valve away from its seat.

6. The combination with a casing having a chamber therein which opens at the outer surface of said casing, a member having a valve seat mounted in said chamber with the valve seat toward the surface opening of said chamber, and a valve adapted to engage said valve seat, of a retaining member mounted in said chamber comprising a disc portion adapted to closely fit into said chamber and a cylindrical portion extending into said chamber from said disc portion and of lesser diameter than said disc portion, the inner end of said cylindrical portion being adapted to engage said seat member to hold it in operative position, a spring interposed between said disc portion of said retaining member and said valve for biasing said valve toward said valve seat, and means for securing the said retaining member within said chamber.

7. The combination with a casing having a chamber therein which opens at the outer surface of said casing, of a valve seat member mounted in said casing having an annular valve seat facing the open end of said chamber and a cylindrical portion surrounding said valve seat, a valve adapted to engage said valve seat and to be guided by said cylindrical portion, a second member supported within said chamber and comprising a disc portion having extending therefrom an inner cylindrical portion and an outer perforate cylindrical portion in spaced concentric relation to said inner cylindrical portion, the inner end of said outer cylindrical portion being adapted to register with and engage the end of the cylindrical portion of said first named member for securing said first member in operative position, and the inner cylindrical portion being adapted to limit the movement of the said valve away from said annular valve seat, a spring disposed within said inner cylindrical portion of said second member and interposed between and engaging said valve and the disc portion of said second member for biasing said valve toward the valve seat on said first member, and means for securing said second member within said chamber.

8. The combination with a casing having a chamber through which fluid under pressure is adapted to flow, a valve seat member mounted in said chamber and having a valve seat, of a closure for said chamber, constituting a flexible diaphragm subject to fluid pressure within said chamber, a valve movable into engagement with said seat, and a retaining member mounted in said chamber for retaining said seat member and for supporting the movable portion of said diaphragm, said retaining member having grooves in its diaphragm supporting face for supplying fluid from the central portion toward the periphery of the face for maintaining a portion of the diaphragm out of contact with said retaining member.

9. The combination with a casing having a chamber through which fluid under pressure is adapted to flow, a valve seat member mounted in said chamber and having a valve seat, a closure for said chamber constituting a flexible diaphragm subject to fluid pressure within said chamber, a valve movable into engagement with said seat, and a retaining member mounted in said chamber for retaining said seat member and for supporting the movable portion of said diaphragm, said retaining member having radial grooves in its diaphragm supporting face for permitting the free flow of fluid from the central portion to the periphery of the face to maintain a portion of the diaphragm out of contact with said retaining member.

10. The combination with a casing having a chamber through which fluid under pressure is adapted to flow, of a valve seat member mounted in said chamber and having a valve seat, a closure for said chamber constituting a flexible diaphragm subject to fluid pressure within said chamber, a valve movable into engagement with said seat, and a retaining member mounted in said chamber for retaining said seat member and for supporting the movable portion of said diaphragm having an outer annular flange extending into engagement with said diaphragm for forming a chamber between the diaphragm and the face of the retaining member, said retaining member having a central opening therethrough and having radial grooves extending from the central opening along the diaphragm supporting face to the periphery of said member for supplying fluid under pressure to the face between the diaphragm and the face of the retaining member.

11. The combination with a casing having a chamber through which fluid under pressure is adapted to flow, the inner wall of which is formed by a series of bores of increasing diameter from the inner toward the outer end thereof, a valve seat positioned in the inner bore and a valve positioned adjacent to said seat, a valve seat member positioned in a larger bore and having a cylindrical wall on its inner face extending adjacent said valve to limit its movement from its seat, said valve seat member having a valve seat on its outer face and a cylindrical wall extending about the valve seat, a valve positioned within said cylindrical wall and guided thereby for movement into and out of engagement with said valve seat, a retaining member inserted in the chamber and having a cylindrical portion registering with and engaging the outer end of the cylindrical portion of said valve seat member, said retaining member having an outer periphery for interfitting the outer bore of said series of bores and an inwardly extending annular flange for engaging the shoulder between the outer and next adjacent bores of said series of bores, a spring interposed between and engaging said last mentioned valve and said retaining member for biasing said valve toward its seat, and means on the retaining member for centering said spring and for limiting movement of said valve from its seat.

12. The combination with a casing having a chamber through which fluid under pressure is adapted to flow, of a member mounted in said chamber and having a valve seat on its outer face, the inner face of said member engaging a gasket adjacent to a shoulder formed in the casing member for limiting the inward movement of said valve seat member, said member having a cylindrical guide wall portion of less diameter than the chamber, a valve within the guide portion movable into engagement with said valve seat, a retaining member inserted in the chamber and having a cylindrical portion registering with and engaging the outer end of said cylindrical portion of said valve seat member, said retaining member having an inwardly extending flange for engaging a shoulder in the casing to limit the inward movement of said retaining member and having means engaging said casing for centering said retaining member within said chamber, a spring interposed between and engaging said valve and said retaining member for biasing said valve toward its seat, and means on said retaining member for centering said spring and for limiting the movement of said valve away from its seat.

CLYDE C. FARMER.